Oct. 25, 1949.   E. A. J. ERICSSON   2,486,136
FRACTURE NAIL
Filed May 10, 1947

INVENTOR.
Ernst Axel Johan Ericsson
BY

Patented Oct. 25, 1949

2,486,136

UNITED STATES PATENT OFFICE 2,486,136

FRACTURE NAIL

Ernst Axel Johan Ericsson, Goteborg, Sweden

Application May 10, 1947, Serial No. 747,248
In Sweden September 1, 1945

Section 1, Public Law 690, August 8, 1946
Patent expires September 1, 1965

3 Claims. (Cl. 128—92)

The present invention relates to such fracture nails as are intended to be used in setting of fractures of the neck of the thigh-bone or other bones. Such a nail comprises a stem having longitudinal ridges and a head on one of its ends. The head of the nail is provided with means such as a transverse hole adapted to receive a pin or screw for securing the nail after its insertion into the bone. If, for instance, the head of a nail for thigh-bone neck fracture be provided with a transverse hole for an attaching screw, the axis of the hole must be located substantially in a common axial plane through the thigh-bone and its neck. In the use of prior fracture nails, having the stem and head immovably connected to each other, the nail after its insertion into the bone must have such a position that the transverse hole through the nail head gets the direction above mentioned. A considerable deviation from this direction causes that the securing pin or screw cannot be inserted into the bone or that said pin or screw can be inserted only with a short portion of its length. Of course, the head of the nail may be provided with a plurality of transverse holes, but some holes with the desired diameter will weaken the head and, in all events, they cannot be provided in such a great number that, irrespective of the rotary position of the nail with respect to its longitudinal axis, the axis of one hole always will be positioned approximately in the axial plane through the thigh-bone and the neck thereof.

According to my invention the stem and head of the nail are connected with each other in such a manner that they are mutually revoluble substantially about the axis of the nail at least a substantial part of a revolution. The connection between the stem and the head of the nail is preferably of such a character that the head is rotary without axial movement in relation to the stem.

Figure 1:
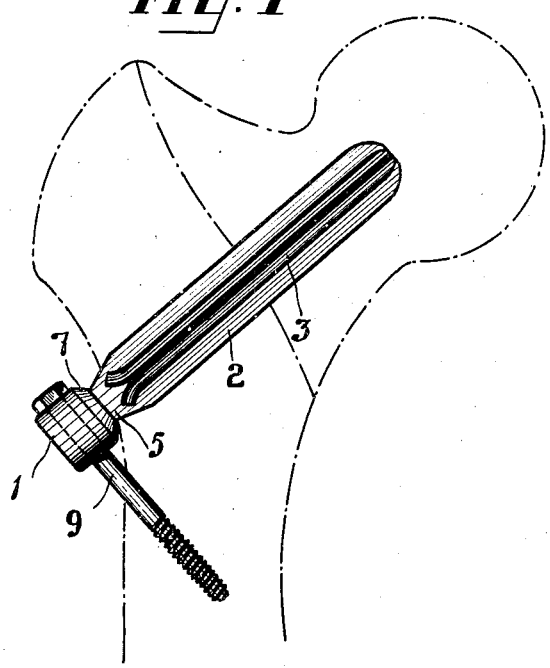
Figure 2:
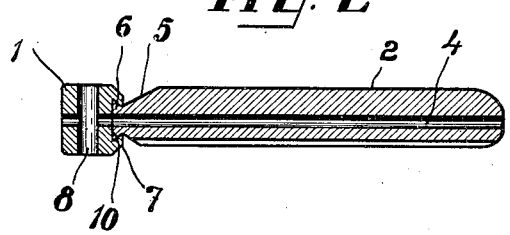
Figure 3:
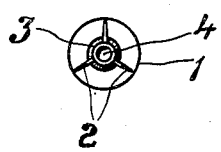

An embodiment of the invention is illustrated in the drawing. Fig. 1 shows a side elevation of a nail inserted into the neck of a thigh-bone. Fig. 2 shows a longitudinal section of the nail and Fig. 3 shows the nail viewed from its forward end.

In the drawing, 1 indicates the head of the nail, and 2 the longitudinal, thin ridges projecting substantially radially from a central cylindrical portion 3 of the stem. The number of said ridges may vary. In the drawing, the ridges are three in number and form angles of about 120 degrees to each other. The head 1 and central stem portion 3 are provided with a substantially central, longitudinal hole or bore 4. This hole or bore can receive a borer or drilling wire inserted into the bone before the insertion of the nail. This wire in cooperation with the bore 4 of the nail will guide the nail when the latter is driven into the bone, as is described in my American Patent No. 1,951,278. But the invention is not restricted to nails with a longitudinal, central guide hole but may also be applied to nails without such a guide hole. The stem and head of the nail are made in two parts which are connected with each other and mutually revoluble about the longitudinal axis of the nail. The portion 5 of the nail stem adjacent to the head 1 has a tapering form lessening in thickness towards the head 1 but the extreme end portion 6 of the stem is widened and forms a conical flange. The end portion of the stem adjacent to the head thus has substantially the shape of a double cone 5, 6. The conical end portion or flange 6 of the stem is fitted in a corresponding recess 10 in the nail head which engages with the flange 6 by means of an inwardly directed flange or collar 7 on the nail head, so that rotation of the latter about the cone axis, which coincides with the axis of the stem, is permitted. The rotation of the head in relation to the stem will, however, not cause any mutual axial movement of said parts. Furthermore the connection between the two parts is of such a character as not to permit the separation of the parts from each other. Outside the flange or collar 7 the head 1 is provided with a transverse hole 8 directed substantially perpendicularly to the axis of the nail.

When the nail is driven into the bone, it is not necessary to particularly observe the position of the hole 8. After the insertion of the nail, as shown by Fig. 1, the head 1 can be revolved about the axis of the nail so that the axis of the hole 8 is moved to substantially coincide with the axial plane through the thigh-bone and the neck thereof. In this position the hole 8 should be located when the nail is secured in its inserted position by a pin or screw 9, which is inserted through the hole 8 and driven or screwed into the bone portion below the nail. If required, by means of a drilling apparatus a bore for the pin or screw is made in the bone before the attachment of the pin or screw to the bone.

By preference the nail is freely revoluble about the stem. But the invention also covers embodiments in which the head is revoluble only parts of a revolution but preferably at least about 180 degrees in relation to the stem.

The invention is also in other respects not restricted to the embodiment described. Instead of a transverse hole the head of the nail may be provided with a pin or the like projecting substantially radially from said head and adapted to engage with a socket or the like screwed to the bone. Also in such an embodiment it is necessary that the axis of said pin is positioned in the common axial plane through the thigh-bone and its neck.

What I claim is:

1. A fracture nail arrangement comprising in combination a nail stem adapted to be inserted in a bone; longitudinal ridges on said nail stem preventing turning of the same about its longitudinal axis; a nail head; means mounting said nail head on one end of said nail stem turnably about said longitudinal axis of the same; means on said nail for preventing movement of said nail head in direction of said longitudinal axis of said nail stem relative to said stem; and securing means movably attached at one end to said head and securable at the other end to said bone for preventing movement of said head in direction of said longitudinal axis of said nail stem thereby preventing sliding of said nail stem in axial direction after having been inserted in the bone.

2. A fracture nail arrangement comprising in combination a nail stem adapted to be inserted in a bone; projections on said nail stem preventing turning of the same about its longitudinal axis; a nail head; means attaching said nail head to one end of said nail stem turnably about said longitudinal axis of the same; means on said nail for preventing movement of said nail head in direction of said longitudinal axis of said nail stem relative to said nail stem; and securing means attached to said nail head turnable together with the same, said securing means including a projection extending at an angle to said longitudinal axis of said nail stem and being movable in its own axial direction relative to said nail head so as to be insertable in said bone and to prevent movement of said head in axial direction of said nail stem thereby preventing sliding of said nail stem in axial direction after having been inserted in the bone.

3. A fracture nail arrangement comprising in combination a nail stem adapted to be inserted in a bone; longitudinal ridges on said nail stem preventing turning of the same about its longitudinal axis; a nail head; attaching means mounting said nail head on one end of said nail stem turnably about said longitudinal axis of the same; means on said nail for preventing movement of said nail head in direction of said longitudinal axis of said nail stem relative to said nail stem; a transversal hole passing through said head substantially normal to said longitudinal axis of said nail stem; and a screw passing through said hole in said head movably in axial direction of said screw and being insertable in said bone so as to prevent movement of said head in direction of said longitudinal axis of said nail stem thereby preventing sliding of said nail stem in axial direction after having been inserted in the bone.

ERNST AXEL JOHAN ERICSSON.

REFERENCES CITED

The following references are of record in the file of this patent:

UNITED STATES PATENTS

| Number | Name | Date |
| --- | --- | --- |
| 1,951,278 | Ericsson | Mar. 13, 1934 |
| 2,441,765 | Hopkins | May 18, 1948 |

FOREIGN PATENTS

| Number | Country | Date |
| --- | --- | --- |
| 95,658 | Sweden | Mar. 9, 1939 |
| 108,347 | Sweden | Aug. 31, 1943 |